Figure 1:
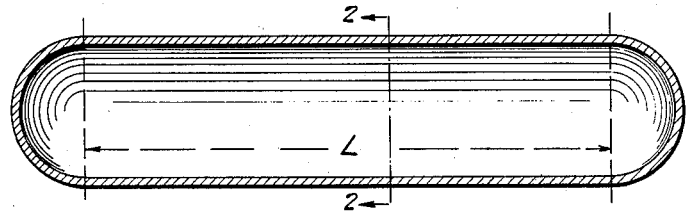

Jan. 14, 1930.  B. BROIDO  1,743,877
HIGH PRESSURE DRUM AND METHOD FOR MAKING IT
Filed Nov. 12, 1926  2 Sheets-Sheet 1

Benjamin Broido INVENTOR.
BY O. V. Thiele
ATTORNEY.

Jan. 14, 1930.    B. BROIDO    1,743,877
HIGH PRESSURE DRUM AND METHOD FOR MAKING IT
Filed Nov. 12, 1926    2 Sheets-Sheet 2
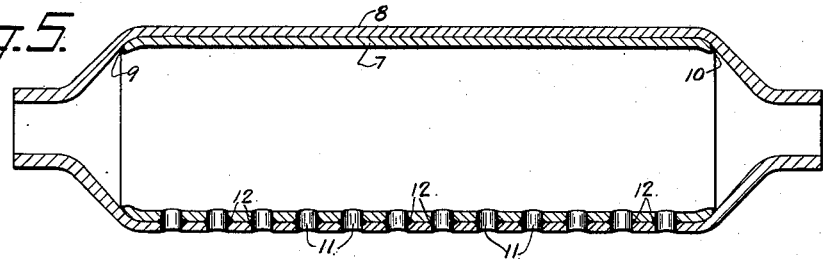
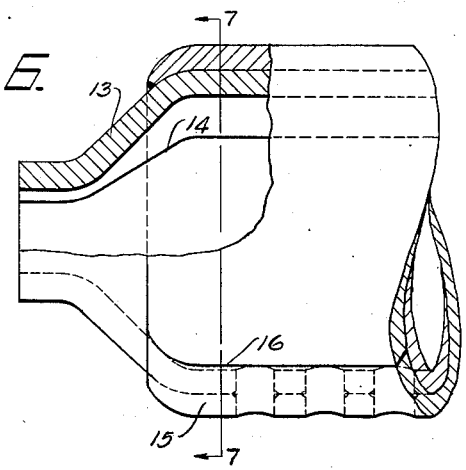
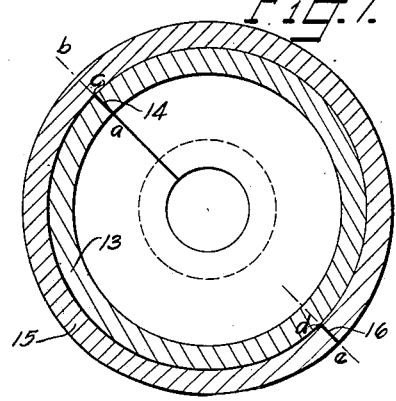
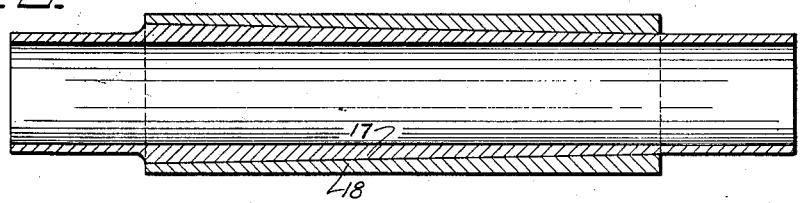
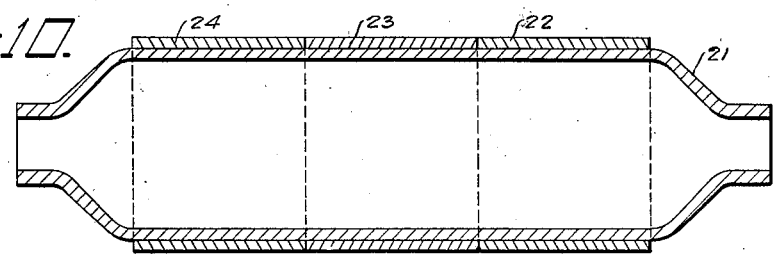
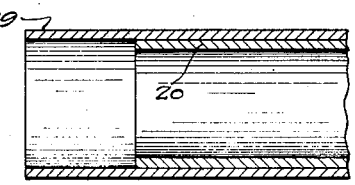
Benjamin Broido INVENTOR.
BY O. V. Thiele
ATTORNEY.

Patented Jan. 14, 1930

1,743,877

UNITED STATES PATENT OFFICE

BENJAMIN BROIDO, OF NEW YORK, N. Y., ASSIGNOR TO THE SUPERHEATER COMPANY, OF NEW YORK, N. Y.

HIGH-PRESSURE DRUM AND METHOD FOR MAKING IT

Application filed November 12, 1926. Serial No. 147,934.

My invention relates to drums capable of withstanding high internal pressure and has particular reference to the construction of large cylindrical drums suitable for use in steam boilers operating at extremely high pressures, although it is to be understood that the invention is not limited to drums meant for this particular use.

The modern development of the boiler art has led to the construction of single boilers in large units and has moreover made desirable the operation of these units at extremely high pressures. In some instances boilers are made operating at pressures in excess of 1000 lbs. per sq. in., but boilers operating at this or higher pressures have been limited heretofore to comparatively small size because of the difficulty and great expense incurred in providing drums in large sizes which will withstand these high pressures. For example, a boiler 48″ in diameter capable of withstanding a pressure of 1200 lbs. per sq. in. and made from the ordinary grade of boiler steel with a reasonable factor of safety (say 5) requires a wall thickness exceeding 4″. Material of this weight and thickness cannot be riveted and the construction of a forged drum 48″ in diameter by 20 or more feet in length and with a wall thickness of 4″ can be accomplished only by a forging process which is extremely expensive and which furthermore cannot be performed except in a few establishments equipped with the necessary facilities for handling material of this character and weight, such as plants devoted to the manufacture of heavy ordnance.

The size of drum above referred to has heretofore been as far as I am aware approximately the maximum which can be practically forged as an integral unit, and while a boiler of large capacity can be constructed by the use of several of these drums, the cost is so great as to make this practice economically prohibitive.

The construction of drums from heavy flat sheets rolled to cylindrical form and welded along a longitudinal seam has been proposed, but this construction is not desirable because of the great difficulty and expense involved in carrying out the process. In addition to this, ordinary welds of this character are likely to be weaker by a considerable margin than the other portions of the drum structure, which renders such drums particularly unsuitable for high pressure duty. I am aware, however, that special processes have been developed for the manufacture of welded drums in which a weld strength as great as that of the balance of the drum structure is assured.

Figure 2:
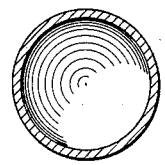
Figure 4:
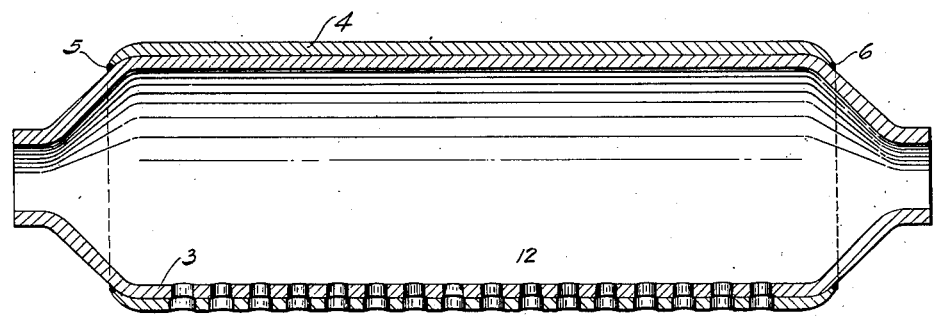
Figure 3:
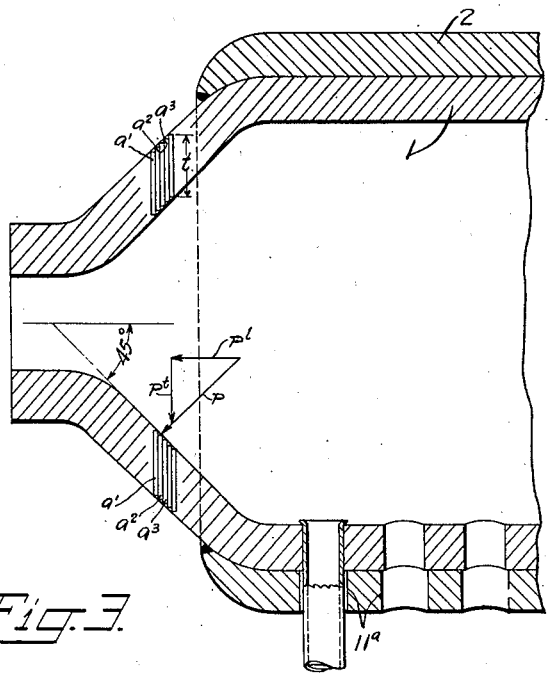

The primary object of the present invention is the elimination of the above difficulties by the provision of a drum which is capable of safely withstanding extreme internal pressures but which may be manufactured of material of considerably less thickness than that ultimately required in certain portions of the drum. A further object of the invention is the provision of a drum comprising a forging of less wall thickness than that required to withstand the maximum pressure to which the drum is to be subjected, reinforced where necessary to withstand the maximum stress which the drum must withstand. Still another object of the invention is the provision of a form of drum capable of withstanding extreme pressures which can be manufactured from rolled and welded plate of moderate thickness and in which any weakening effect due to ordinary welding is rendered unobjectionable without resort to the special processes above referred to. Other and more detailed objects of the invention will appear in connection with the following description of the invention and of the preferred embodiments thereof illustrated in the accompanying drawings in which Fig. 1 is a longitudinal section taken through an illustrative cylinder; Fig. 2 is a section taken on the line 2—2 of Fig. 1; Fig. 3 is a fragmentary longitudinal section of a drum embodying the invention;

Fig. 4 is a longitudinal section of a complete drum; Fig. 5 is a section similar to Fig. 4 of a modified form of drum; Fig. 6 is a fragmentary elevation partly in section of a further modification; Fig. 7 is a section taken on the line 7—7 of Fig. 6; Fig. 8 is a longitudinal section of assembled elements forming the drum; Fig. 9 is a fragmentary view similar to Fig. 8 showing a different arrangement, and Fig. 10 is another view similar to Fig. 8 of a further modification.

In order to more clearly illustrate the basis of my invention, I will consider first the stresses exerted by uniform internal pressure on a cylindrical drum having hemispherical ends, which I have illustrated in longitudinal section in Fig. 1 and in transverse section in Fig. 2.

Considering first the central cylindrical section L, the force or stress per unit area exerted thereon by internal pressure within the drum may be resolved into two component stresses, one of which acts transversely and tends to rupture the cylinder along a line parallel to its longitudinal axis and the other of which acts longitudinally and tends to rupture the cylinder along a line transversely to the longitudinal axis. The former, to be hereinafter referred to as the transverse stress and designated as K, may be determined from the formula $$(1) \quad K = \frac{D \times P \times L}{2T \times L} = \frac{D \times P}{2T}$$

while the latter stress, to be hereinafter referred to as the longitudinal stress and designated as K', may be evaluated from the formula $$(2) \quad K' = \frac{D^2 \times \pi \times P}{4 \times D \times \pi \times T} = \frac{D \times P}{4T}$$

In these formulae, K and K' represent the stress per unit area, D the internal diameter of the cylinder, P the pressure per unit area, L the length of the cylinder and T the thickness of the cylinder wall.

From the above formulae it will be apparent that the maximum stress which must be resisted by the cylindrical portion of the drum is the transverse stress K, and that this stress is double the longitudinal stress K'.

Considering now the hemispherical ends of the drum, it will be evident that the unit stress K'' exerted upon them will be the same as that exerted on a sphere subjected to internal pressures, and this unit stress is given by the formula $$(3) \quad K'' = \frac{D^2 \times \pi \times P}{4 \times D \times \pi \times T} = \frac{D \times P}{4T}$$

from which it will be noted that the stress K'' is the same as the longitudinal stress K'.

From the foregoing it will be evident that a closed cylinder under internal pressure is subjected to twice the stress tending to rupture it longitudinally as is exerted tending to rupture it transversely, and by my invention I propose to utilize this fact by forming a drum of telescoped sleeves (which themselves may be either integral or laminated) one of which is of sufficient thickness to withstand only the longitudinal or smaller stress and the other or others of which are used to reinforce this member only over those portions where it is subjected to the transverse or larger rupturing stress. By this method I can, for example, construct a drum including the end portions, from a sleeve only one half as thick as that required to withstand the transverse stress, and reinforce this sleeve by means of either an internal or external open-ended cylindrical sleeve so that the cylindrical portion of the drum is of sufficient total wall thickness to withstand the maximum transverse stress exerted thereon. In other words, because of the fact that the longitudinal stress is only one half the transverse stress I am able to construct a drum which will have the requisite strength, but in which the end portions thereof may be of only one half the wall thickness (normal to the wall surface) of the central cylindrical section.

While the cylindrical section of the drum may be readily built up to any desired thickness by telescoping two or more sleeves, it will be apparent that the swaging down of very heavy metal to form the drum ends, whether it be integral or laminated, is a very difficult and expensive process. In accordance with my invention, however, the ends of the drum are formed from a less number of sleeves than the total number employed in the construction of the complete drum so that the thickness and weight of metal to be swaged is considerably less than the maximum used in the drum, with a consequent reduction in cost of manufacture.

In the above consideration of the stresses to which a drum is subjected, I have for the sake of simplicity assumed a drum with hemispherical ends, but the application to my invention of the principle there involved is not limited to drums having hemispherical ends. It is equally proper in the case of drums having conical ends of the form usually employed in drums of this character, in which the ends of the drum are swaged down from the maximum diameter to open ends of comparatively small diameter, the latter being closed by manhole covers of any suitable form.

In swaging down a drum to this form, the wall thickness of the metal is usually considerably thickened by the swaging process, but this thickening of the wall will be disregarded in the following discussion and a conical end having the same wall thickness as that of the cylindrical portion of the drum will be considered.

Referring now to Fig. 3, I have shown an enlarged fragmentary longitudinal section of a boiler drum built in accordance with my invention and comprising an inner sleeve 1 having integral conical ends and an outer reinforcing sleeve 2 of the same thickness as sleeve 1, but not extending over the ends thereof. In order to illustrate the stresses imposed on the drum and its capacity to properly resist them when constructed in accordance with my invention, I will assume that the diameter of the drum is 48", the tensile strength of the material 50,000 lbs. per sq. in., the operating pressure 1200 lbs. per sq. in., and the factor of safety desired 5. I will also assume that the angle of the swaged end as shown is 45 deg. and that the cylindrical section of the drum has been provided with tube holes of such diameter and spacing that the strength of this portion of the drum has been reduced by the removal of metal to .7 of that of an imperforate drum of the same dimensions. Under these conditions the wall thickness required over the central cylindrical section of the drum (which is perforated with tube holes) to withstand the larger stress K is found to be $$(4) \quad T = \frac{48 \times 1200 \times 5}{2 \times 50,000 \times .7} = 4.11 + ''$$

The wall thickness required being 4.11", the inner sleeve 1 and the outer sleeve 2 are each made 2.06" thick, and because of the fact that the longitudinal stress is only one half the transverse stress, the central cylindrical section of sleeve 1 is alone capable of withstanding the longitudinal stress imposed. This ability of sleeve 1 to withstand the entire longitudinal stress is necessary, as obviously this stress is not transmitted in any appreciable degree to the outer sleeve 2.

There remain to be considered the conical end sections formed by the swaged and unreinforced portions of sleeve 1 and for the purpose of illustrating the stresses imposed on them, I will consider them as formed by a large number of elemental cylinders $a^1$, $a^2$, $a^3$, etc., having a wall thickness of $t$ and of length 1.

The force exerted by internal pressure must, to rupture the drum ends, either separate the cylinders longitudinally of, or rupture them transversely of, the drum. As the unit force or pressure P acts normal to the drum surface, it must be resolved into its longitudinal and transverse components $P^1$ and $P^t$ respectively in determining the stresses imposed on the cylinders $a^1$, $a^2$, etc., and in the case assumed $P^1$ and $P^t$ each are equal to $$\frac{1200}{\sqrt{2}} = 850 \text{ lbs. (approx.)}$$

As the wall thickness of the central section of sleeve 1 is sufficient to withstand the longitudinal stress set up by unit pressure P acting over the entire area of the drum end, it is immediately apparent that the smaller component force $P^1$ would be insufficient to separate the elemental cylinders longitudinally even if the thickness of metal $t$ resisting this stress were no greater than the wall thickness T in the central section of the sleeve. As the thickness $t$ is $$2.06 \times \sqrt{2} = 2.91 \text{ (approx.)}$$

the factor of safety of the end sections against longitudinal stress is even greater than in the central cylindrical section.

The transverse rupturing stress K, which would be most severe in the case of the elemental cylinder having the full diameter of the drum, is measured by the general formula $$(1) \quad K = \frac{D \times P}{2T}$$

which with the values of $P^t$ and $t$ substituted therein, and for the elemental cylinder of largest diameter becomes $$(5) \quad K = \frac{48 \times \frac{1200}{2}}{2 \times 2.06 \times \sqrt{2}} = 7000 \text{ lbs. (approx.)}$$

With a material having a 50,000 lbs. tensile strength, the factor of safety with respect to this stress is greater than 7 and it therefore becomes evident that the conical end portions of the drum will have a greater factor of safety with respect to both longitudinal and transverse stress than the central cylindrical section of the drum including its reinforcing sleeve.

In the example just considered, I have assumed that the sleeves 1 and 2 are of equal wall thickness, but in view of the fact that the end sections are stronger than the central section under these conditions, it will be seen that the sleeve which is swaged down to form the ends of the drum may be of less than half the total thickness of the cylindrical portion of the drum. The necessary strength for the cylindrical portion would in this case be assured by the use of one or more reinforcing sleeves of sufficient thickness to bring the total thickness of the drum along this section up to the total required to equal the strength of the end sections.

Furthermore, in order to secure adequate strength of the ends of the drum, it is not necessary that the angle at which the ends are forged be 45 deg., for if the walls of the drum ends be made at a greater angle to the longitudinal axis of the drum, say 60 deg., the thickness $t$ of the wall section resisting the transverse force $P^t$ is increased and the thickness of the drum walls resisting the force $P^1$, while becoming less as the angle is increased, is never as small as the thickness of metal in the cylindrical section of the drum, which is ample to resist the longitudinal stress. Conversely, if the walls of the drum ends are formed at say a 30 deg. angle to the longitudinal axis of the drum, the wall thickness $t$ is diminished and this limits the degree to which the angle may be reduced, but as at a 45 deg. angle the drum end is considerably stronger than the central section, the minimum angle permissible will be less than 45 deg. The foregoing is sufficient to illustrate the flexibility of design possible by the use of my invention, and this flexibility is further extended by the fact, as previously pointed out, that in swaging down the end of the drum from the maximum diameter to the minimum diameter at the manhole opening, the thickness of the metal normal to its surface must be increased unless the end of the drum as it is swaged down is drawn out and the surplus metal removed from the small end thereof. Practically, the former procedure is the easier of accomplishment, and the drum end will therefore usually be further strengthened by the thickening of the metal incident to the swaging process.

In Fig. 4 I have shown in longitudinal section a preferred form of drum constructed in accordance with my invention in which the drum is formed by an integral cylindrical sleeve 3 swaged down at its ends and reinforced over its central section by a sleeve 4 which is preferably peened down slightly at its ends over the swaged ends of sleeve 3 and circumferentially welded, if desired, at 5 and 6. Fig. 5 illustrates a modified form of drum in which the sleeve 7 is placed inside the sleeve 8 which forms the drum ends, the two sleeves being welded circumferentially at points 9 and 10. This form of drum is not, however, so desirable as the form shown in Fig. 4 as in this instance the reinforcing effect of the sleeve 7 will be lost if leakage occurs at either the weld 9 or 10. Such leakage would allow pressure to build up between the sleeves 7 and 8 and thereby neutralize the resistance of the inner sleeve 7 to internal stress. With the form shown in Fig. 4 it will be obvious that the welds 5 and 6 need not be employed, and if used need not be pressure-tight in order to make the outer sleeve 4 effective.

The drum illustrated in Fig. 5 has been shown with the tube holes 11 provided with circumferential welds 12 at the seam between the inner and outer sleeves. Because of the thickness of drums of this character, the boiler tubes are in some cases not expanded into the tube holes over the full depth thereof, and in case the tubes are secured by a method which makes a tight joint between the tube and the outer sleeve only of the drum, welds such as 12 are necessary in order to prevent pressure building up between the sleeves. Obviously the necessity of pressure-tight joints at the tube hole seams is independent of the position of the reinforcing member. That is to say, welds or equivalent sealing means are necessary whether the drum be of the form shown in Fig. 4 or that shown in Fig. 5, if the tubes are secured in the outer sleeve only.

In Figs. 3 and 4 I have shown another form of construction in which welds such as 12 are eliminated. In this case the tube holes 11$^a$ in the outer sleeve are made slightly larger in diameter than the tube holes in the inner sleeve, and the boiler tubes are expanded in the inner sleeve only. With this construction any leakage between the tube and drum is free to pass to the atmosphere by way of the annular space between the tube and the tube hole 11$^a$. Obviously the tube hole construction illustrated in Fig. 4 may be used in a drum such as shown in Fig. 5 and vice versa.

My invention further lends itself advantageously to the manufacture of high pressure drums from rolled and longitudinally welded plate. With drums composed of cylindrical members made from rolled and welded plate, the cylinders are assembled with the welds diametrically opposed so that over the central cylindrical section of the drums the reduction in the efficiency of the completed drum due to the welded joints would be a fraction only of the reduction in efficiency if the drum were made from a single thickness of material welded along one seam. In other words, if the weld efficiency is 60%, a drum having two concentric cylinders of equal thickness welded along opposed seams will have an efficiency greater than that of a drum formed from a single welded sheet.

In Fig. 6 I have shown a fragmentary elevation partly in longitudinal section illustrating a drum made from two rolled and welded sleeves, with the inner sleeve 13 welded along the seam 14 and the outer sleeve 15 welded along the seam 16, the latter being diametrically opposite the seam 14.

Referring to the sectional view shown in Fig. 7, it will be apparent that the efficiency of the drum along a section such as $a$—$b$ including one of the welds will be greater than if the weld extended through the entire drum wall at this point. Assuming the sleeves of equal thickness and the weld 60% efficient, the efficiency of the drum taken along the line $a$—$b$ would be raised to 80% because of the integral inner wall 13 at the point of this section. In considering the strength of the drum, however, possible rupture along a line $a$—$c$—$d$—$e$, and including both welds 14 and 16 must be considered. In this case the efficiency of the section is increased above the 60% assumed for the welds by the fact that the welds are diametrically opposed and that the total resistance to rupture is the resistance of welds 14 and 16 plus the frictional resistance of the semicylindrical surface $c$—$d$. Because of the intimate contact between the inner and outer sleeves the frictional resistance is of considerable magnitude and the efficiency of the section a—c—d—e through the drum is materially raised.

The end section of the sleeve 13 is with this method of construction wholly dependent upon a single welded joint but as has been previously pointed out, this portion of the drum normally has a greater factor of safety than the central cylindrical portion, which may be made to compensate for the loss in efficiency as compared with the central section due to the single welded joint in the end section. For example, if the proportions of the drum are such that with integral sleeves the central section has a factor of safety of 5 and the end sections a factor of safety of 7, a substitution of welded sleeves having joint efficiencies of 60% would reduce the factor of safety in the end sections of the drum to 4.2. Assuming that the staggered weld construction shown in Fig. 7 results in an increase of efficiency to 80%, the factor of safety in the case o. is section is reduced to 4, so it is evident that in the welded form as well as the integral form the ends of the drum will normally be stronger than the central section.

In the manufacture of drums in accordance with my invention I prefer to use two cylindrical sleeves of different lengths, the longer of which is used in forming the drum ends. The sleeves may be telescoped either before or after the drum ends are swaged down in the manufacture of drums of the type shown in Fig. 4, but if the drum is made as shown in Fig. 5 the inner sleeve must be inserted before the swaging operation is carried out. The form of drum shown in Fig. 4 is to be preferred because with this form the swaging operation may be carried out before the sleeves are telescoped and in this way the weight of the material being handled during the swaging process may be materially reduced. If the longer sleeve is swaged before the outer reinforcing sleeve is applied, a tight fit between the two sleeves may be secured by shrinking the outer sleeve on the inner sleeve or, as illustrated in exaggerated form in Fig. 8, the outer surface of the inner sleeve 17 and the inner surface of the outer sleeve 18 may be turned with a taper and the sleeve 18 forced to a tight fit by longitudinally applied pressure.

If, for example, the two sleeves 19 and 20 are assembled in the manner shown in Fig. 9 before the ends are swaged, a tight fit may be secured between them by the use of ordinary rolling processes well known to those skilled in the art, instead of by the shrinking or taper methods previously pointed out.

In Fig. 10 I have shown a form of drum in which the inner sleeve 21 is reinforced by a number of sections 22, 23 and 24 which together form the reinforcing sleeve. Obviously, the reinforcing sleeve or sleeves in any form of drum embodying my invention may be made in sections and in describing and claiming the invention it is to be understood that the term sleeve as applied to sleeves used for reinforcing, is to include those formed of a plurality of sections.

From the foregoing it will be apparent that my invention enables drums of the size now in use to be manufactured for extremely high pressure work at a distinct saving, as the weight and thickness of material which it is necessary to handle as a unit may be materially decreased, and in the most expensive operation (that of forging the drum ends) the cost incurred by present practice may be reduced by as much as one half because of the relatively light material which must be swaged. It will also be apparent that by the use of my invention much larger high pressure drums than are now in use may be manufactured if material is used for each of the sleeves which is as heavy as that now being utilized and forming integral forged drums.

While in the present disclosure I have chosen for illustrative purposes only drums constructed from two sleeves and with the drum ends in all cases integral with one of the sleeves, it will be readily apparent that more than two sleeves may be employed, and it will be further apparent that the drum ends need not necessarily be integral with one or more of the sleeves. In some instances, the thickness of the metal required in the drum ends may be such that they may be made separately and riveted to the sleeve or sleeves having approximately the same thickness as the drum ends, but I consider the integral form such as I have shown in the illustrative embodiments herein the form to be preferred for most uses. The several forms of drum shown herein are, therefore, to be considered as illustrative only and such changes and modifications are to be considered as contemplated by the invention as may fall within the scope of the appended claims.

I claim:

1. The method of making cylindrical drums comprising the steps of symmetrically telescoping a plurality of sleeves of different lengths, assembling said sleeves in intimate circumferential contact with one another, and forming the drum ends from the extended end portions of the longer sleeve.

2. The method of making cylindrical drums comprising the steps of symmetrically telescoping a pair of sleeves of different lengths, assembling said sleeves in intimate circumferential contact with one another, and forming the drum ends from the extended end portions of the longer sleeve.

3. The method of making cylindrical drums comprising the steps of symmetrically telescoping a plurality of sleeves of different lengths, assembling said sleeves in intimate circumferential contact with one another, and swaging down the extended end portions of the longer sleeve to form truncated conical drum ends.

4. The method of making cylindrical drums comprising the steps of symmetrically telescoping a pair of sleeves of different lengths with the longer sleeve inside the shorter sleeve, assembling said sleeves in intimate circumferential contact with one another, and swaging down the extended end portions of the inner sleeve to form the drum ends.

5. The method of making cylindrical drums comprising the steps of symmetrically telescoping a pair of sleeves of different lengths with the longer sleeve inside the shorter sleeve, forcing said sleeves into intimate circumferential contact with one another to form a substantially unitary blank, and thereafter swaging down the extended end portions of the inner sleeve to form the drum ends.

6. The method of making cylindrical drums comprising the steps of symmetrically telescoping a plurality of sleeves of different lengths, forcing said sleeves into intimate circumferential contact with one another, swaging down the extended end portions of the longer sleeve to form truncated conical drum ends, and thickening the wall section of the drum ends during said swaging.

7. The method of making cylindrical drums comprising the steps of symmetrically telescoping a pair of sleeves of different lengths with the longer sleeve placed within the shorter sleeve, forcing said sleeves into intimate circumferential contact with one another to form a substantially unitary blank, swaging down the extended end portions of the inner sleeve to form truncated conical drum ends, forming a plurality of tube holes extending through said sleeves along the cylindrical portion of the drum, and welding said tube holes circumferentially at the lines of contact between said sleeves.

8. The method of making cylindrical drums comprising the steps of rolling a plurality of sleeves of different diameters and lengths from flat plates, welding said sleeves along the longitudinal seams thereof, symmetrically telescoping said sleeves with said welded seams circumferentially offset, assembling said sleeves in intimate circumferential contact with one another, and forming the drum ends from the extended end portions of the longer sleeve.

9. The method of making cylindrical drums comprising the steps of rolling a pair of sleeves of different diameters and lengths from flat plates, welding said sleeves along the longitudinal seams thereof, symmetrically telescoping said sleeves with the longer sleeve within the shorter sleeve and with said welded seams circumferentially offset, forcing said sleeves into intimate circumferential contact with one another, and swaging down the extended end portions of the inner sleeve to form truncated conical drum ends.

10. The method of making cylindrical drums comprising the steps of rolling a pair of sleeves of different diameters and lengths from flat plates, welding said sleeves along the longitudinal seams thereof, symmetrically telescoping said sleeves with the longer sleeve within the shorter sleeve and with said welded seams circumferentially offset, forcing said sleeves into intimate circumferential contact with one another to form a substantially unitary blank, swaging down the extended end portions of the inner sleeve to form truncated conical drum ends, and thickening the wall section of said drum ends during said swaging.

11. A high pressure drum comprising a cylindrical central section formed by a member of circumferentially contacting telescoped sleeves, and end sections connected to a less number of said sleeves.

12. A high pressure drum comprising a cylindrical central section formed by a number of circumferentially contacting telescoped sleeves, and end sections integral with a less number of said sleeves.

13. A high pressure drum comprising a cylindrical central section formed by a pair of circumferentially contacting telescoped sleeves, and end sections connected to the inner of said sleeves.

14. A high pressure drum comprising a cylindrical central section formed by a pair of circumferentially contacting telescoped sleeves, and end sections integral with the inner of said sleeves.

15. A high pressure drum comprising a cylindrical central section formed by a pair of circumferentially contacting telescoped sleeves, and truncated conical end sections connected to the inner of said sleeves.

16. A high pressure drum comprising a cylindrical central section formed by a pair of circumferentially contacting telescoped sleeves, and truncated conical end sections integral with the inner of said sleeves.

17. A high pressure boiler drum comprising a cylindrical central section formed by a number of circumferentially contacting telescoped sleeves, and end sections connected to a less number of said sleeves, said central section having formed therein a plurality of tube holes, the diameters of the tube holes in the outer sleeve being greater than the diameters of the tube holes in the inner sleeve.

18. In combination, a cylindrical drum section comprising a sleeve having a plurality of tube holes therein, tubes secured in said tube holes, and a reinforcing sleeve circumferentially engaging the outer surface of said first-named sleeve, said reinforcing sleeve having tube holes therein through which said tubes extend and of greater diameter than said tubes.

19. A high pressure boiler drum having a cylindrical central section formed by a number of circumferentially contacting telescoped sleeves, said sleeves being welded along a longitudinal seam and telescoped with said seams circumferentially offset, and end sections connected to a less number of said sleeves.

20. A high pressure boiler drum having a cylindrical central section formed by a number of circumferentially contacting telescoped sleeves, said sleeves being welded along a longitudinal seam and telescoped with said seams circumferentially offset, and truncated conical end sections integral with a less number of said sleeves, said end sections having a wall thickness greater than the total thickness of the central section of the sleeves with which they are integrally formed.

21. A high pressure boiler drum having a cylindrical central section formed by a pair of circumferentially contacting telescoped sleeves, said sleeves being welded along a longitudinal seam and telescoped with said seams circumferentially offset, and end sections connected to the inner of said sleeves.

22. A high pressure boiler drum having a cylindrical central section formed by a pair of circumferentially contacting telescoped sleeves, said sleeves being welded along a longitudinal seam and telescoped with said seams circumferentially offset, and truncated conical end sections integral with the inner of said sleeves.

BENJAMIN BROIDO.